US009608889B1

(12) United States Patent
Lundin

(10) Patent No.: US 9,608,889 B1
(45) Date of Patent: Mar. 28, 2017

(54) AUDIO CLICK REMOVAL USING PACKET LOSS CONCEALMENT

(71) Applicant: GOOGLE INC., Mountain View, CA (US)

(72) Inventor: Henrik Fahlberg Lundin, Sollentuna (SE)

(73) Assignee: GOOGLE INC., Mountain View, CA (US)

( * ) Notice: Subject to any disclaimer, the term of this patent is extended or adjusted under 35 U.S.C. 154(b) by 335 days.

(21) Appl. No.: 14/088,037

(22) Filed: Nov. 22, 2013

(51) Int. Cl.
*H04L 12/26* (2006.01)

(52) U.S. Cl.
CPC ............................... *H04L 43/0829* (2013.01)

(58) Field of Classification Search
CPC .................................................. H04L 43/0829
See application file for complete search history.

(56) References Cited

U.S. PATENT DOCUMENTS

| | | | |
|---|---|---|---|
| 7,353,169 B1 | 4/2008 | Goodwin et al. | |
| 8,019,089 B2 * | 9/2011 | Seltzer | G10L 21/0208 381/71.1 |
| 8,213,635 B2 | 7/2012 | Li et al. | |
| 8,265,292 B2 | 9/2012 | Leichter | |
| 8,321,206 B2 | 11/2012 | Goodwin et al. | |
| 8,411,874 B2 | 4/2013 | Leichter | |
| 8,538,751 B2 | 9/2013 | Nakadai et al. | |
| 2002/0147590 A1* | 10/2002 | Sydanmaa | G10L 19/005 704/265 |
| 2004/0196989 A1* | 10/2004 | Friedman | G10L 21/04 381/119 |
| 2005/0058145 A1* | 3/2005 | Florencio | G10L 19/005 370/412 |
| 2007/0230361 A1* | 10/2007 | Choudhury | H04L 12/2602 370/250 |
| 2008/0279366 A1 | 11/2008 | Lindbergh | |
| 2010/0088092 A1 | 4/2010 | Bruhn | |
| 2011/0112831 A1 | 5/2011 | Sorensen et al. | |
| 2011/0142257 A1 | 6/2011 | Goodwin et al. | |
| 2011/0243123 A1 | 10/2011 | Munoz-Bustamante et al. | |
| 2013/0253939 A1* | 9/2013 | Tsutsumi | G10L 25/21 704/500 |

OTHER PUBLICATIONS

E. Protalinski, Google will now mute your microphone if you're typing during Google+ Hangout, Apr. 17, 2013, thenextweb.com/google/2013/04/17/google-will-now-mute-your-microphone-if-you're-typing-during-a-google-hangout/.

E. Protalinski, "Skype is considering automatically removing typing sounds from calls", Nov. 14, 2013, thenextweb.com/microsoft/2013/11/14/skype-evaluating-lyncs-typing-suppression-method-feature/.

* cited by examiner

*Primary Examiner* — Mohamed Kamara
*Assistant Examiner* — Thad Defauw
(74) *Attorney, Agent, or Firm* — Birch, Stewart, Kolasch & Birch, LLP

(57) ABSTRACT

Methods and systems are provided for removing transient noises (e.g., keyboard "clicks") detected in an audio signal. An adaptive jitter buffer and packet loss concealer ("JB/PLC") is deployed on the transmitting side of a system (e.g., a Voice-over-IP (VoIP) system) to remove transient noises detected in an audio signal before the signal is transmitted over a network to the receiving side of the system. By utilizing the adaptation capabilities of the JB/PLC, the methods and systems provided produce better-sounding transient removal than other existing approaches.

20 Claims, 4 Drawing Sheets

AUDIO CLICK REMOVAL USING PACKET LOSS CONCEALMENT

BACKGROUND

When using a laptop for audio and/or video conferencing, it is common for the user to be typing on the keyboard of the laptop while on the call. If the laptop's internal microphone is used for the call, this can be a problem. The microphone is often located and fitted such that typing on the keyboard and clicking on the track-pad will generate audible transients (e.g., clicks) in the recorded audio signal. Although barely audible to the generating user, such clicks can often be quite loud for the other parties participating in the conference because of the short distance and mechanical coupling between the keyboard/track-pad buttons and the microphone.

These clicks are, of course, annoying to the listener, while the person generating the noise is often unaware of it.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods, systems, and apparatus for audio signal processing. More specifically, aspects of the present disclosure relate to removing transient noise events detected in an audio signal at a transmitting side of a communications system.

One embodiment of the present disclosure relates to a computer-implemented method for removing transient noise in an audio signal at a transmitting-side of a communications system, the method comprising: receiving an audio signal from an audio input device located at the transmitting-side of the communications system; dividing the received audio signal into blocks of audio data; identifying one or more of the blocks of audio data containing transient noise; discarding the one or more blocks of audio data containing transient noise; and performing loss concealment on the remaining blocks of audio data to form an output audio signal, wherein the loss concealment is performed by an adaptive jitter buffer and packet loss concealer.

In another embodiment, the method for removing transient noise in an audio signal further comprises processing the audio signal through a transient detector to determine locations of transient noise in the audio signal.

In another embodiment, the method for removing transient noise in an audio signal further comprises analyzing one or more audio signal characteristics of the audio signal, and identifying locations of transient noise in the audio signal based on the analyzed audio signal characteristics.

In yet another embodiment, the method for removing transient noise in an audio signal further comprises: encoding the output audio signal; packetizing the encoded output audio signal into a plurality of network packets; and transmitting the plurality of network packets over a network to a receiving-side of the communications system.

In another embodiment of the method for removing transient noise in an audio signal, performing loss concealment on the remaining blocks of audio data to form an output audio signal includes: combining the remaining blocks of audio data; identifying one or more gaps in the combined blocks of audio data, wherein the one or more gaps represent the one or more discarded blocks of audio data containing transient noise; and generating concealment data for each of the one or more gaps in the combined blocks of audio data.

In another embodiment of the method for removing transient noise in an audio signal, generating concealment data for each of the one or more gaps in the combined blocks of audio data includes generating an amount of concealment data that is more than a corresponding size of the gap, and the method further comprises: determining that an amount of audio data stored in a buffer of the adaptive jitter buffer and packet loss concealer exceeds a threshold amount set for the buffer, and compressing the audio data stored in the buffer in the time domain to reduce the amount of audio data below the threshold amount.

Another embodiment of the present disclosure relates to a system for removing transient noise in an audio signal at a transmitting-side of a communications network, the system comprising a transient detector and an adaptive jitter buffer and packet loss concealer, where the transient detector is configured to: receive an audio signal from an audio input device located at the transmitting-side of the communications system, divide the received audio signal into blocks of audio data, identify one or more of the blocks of audio data containing transient noise, and discard the one or more blocks of audio data containing transient noise; and the adaptive jitter buffer and packet loss concealer is configured to perform loss concealment on the remaining blocks of audio data to form an output audio signal.

In another embodiment, the transient detector in the system for removing transient noise in an audio signal is further configured to analyze one or more audio signal characteristics of the audio signal received from the audio input device, and identify locations of transient noise in the audio signal based on the analyzed audio signal characteristics.

In another embodiment, the system for removing transient noise in an audio signal further comprises: an encoder configured to encode the output audio signal; a packetizer configured to packetize the encoded output audio signal into a plurality of network packets; and a transmitter configured to transmit the plurality of network packets over a network to a receiving-side of the communications system.

In yet another embodiment, the adaptive jitter buffer and packet loss concealer in the system for removing transient noise in an audio signal is further configured to: combine the remaining blocks of audio data; identify one or more gaps in the combined blocks of audio data, wherein the one or more gaps represent the one or more blocks of audio data containing transient noise discarded by the transient detector; and generate concealment data for each of the one or more gaps in the combined blocks of audio data.

In still another embodiment, the adaptive jitter buffer and packet loss concealer in the system for removing transient noise in an audio signal is further configured to: generate an amount of concealment data that is more than a corresponding size of the gap; determine that an amount of audio data stored in a buffer of the adaptive jitter buffer and packet loss concealer exceeds a threshold amount set for the buffer; and compress the audio data stored in the buffer in the time domain to reduce the amount of audio data below the threshold amount.

Yet another embodiment of the present disclosure relates to one or more non-transitory computer readable media storing computer-executable instructions that, when executed by one or more processors, causes the one or more processors to perform operations comprising: receiving an audio signal from an audio input device located at a transmitting-side a communications system; dividing the received audio signal into blocks of audio data; identifying one or more of the blocks of audio data containing transient noise; discarding the one or more blocks of audio data containing transient noise; and performing loss concealment on the remaining blocks of audio data to form an output audio signal, wherein the loss concealment is performed by an adaptive jitter buffer and packet loss concealer and includes combining the remaining blocks of audio data, identifying one or more gaps in the combined blocks of audio data, wherein the one or more gaps represent the one or more discarded blocks of audio data containing transient noise, and generating concealment data for each of the one or more gaps in the combined blocks of audio data.

In one or more other embodiments, the methods and systems described herein may optionally include one or more of the following additional features: each of the blocks of audio data contains 10 ms of audio, dividing the audio signal into blocks of audio data includes marking each of the blocks of audio data with a header identifying a sequence number for the block relative to other blocks of the audio signal, the concealment data generated for each of the one or more gaps in the combined blocks of audio data is based on audio data contained in blocks before and/or after the gap, generating concealment data for each of the one or more gaps in the combined blocks of audio data includes generating an amount of concealment data that is more or less than an amount of audio data contained in each of the combined blocks of audio data; the transient detector is configured to mark each of the blocks of audio data with a header identifying a sequence number for the block relative to other blocks of the audio signal; the adaptive jitter buffer and packet loss concealer is configured to generate the concealment data for each of the one or more gaps in the combined blocks of audio data based on audio data contained in blocks before and/or after the gap; and/or the adaptive jitter buffer and packet loss concealer is configured to generate an amount of concealment data that is more or less than an amount of audio data contained in each of the combined blocks of audio data.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
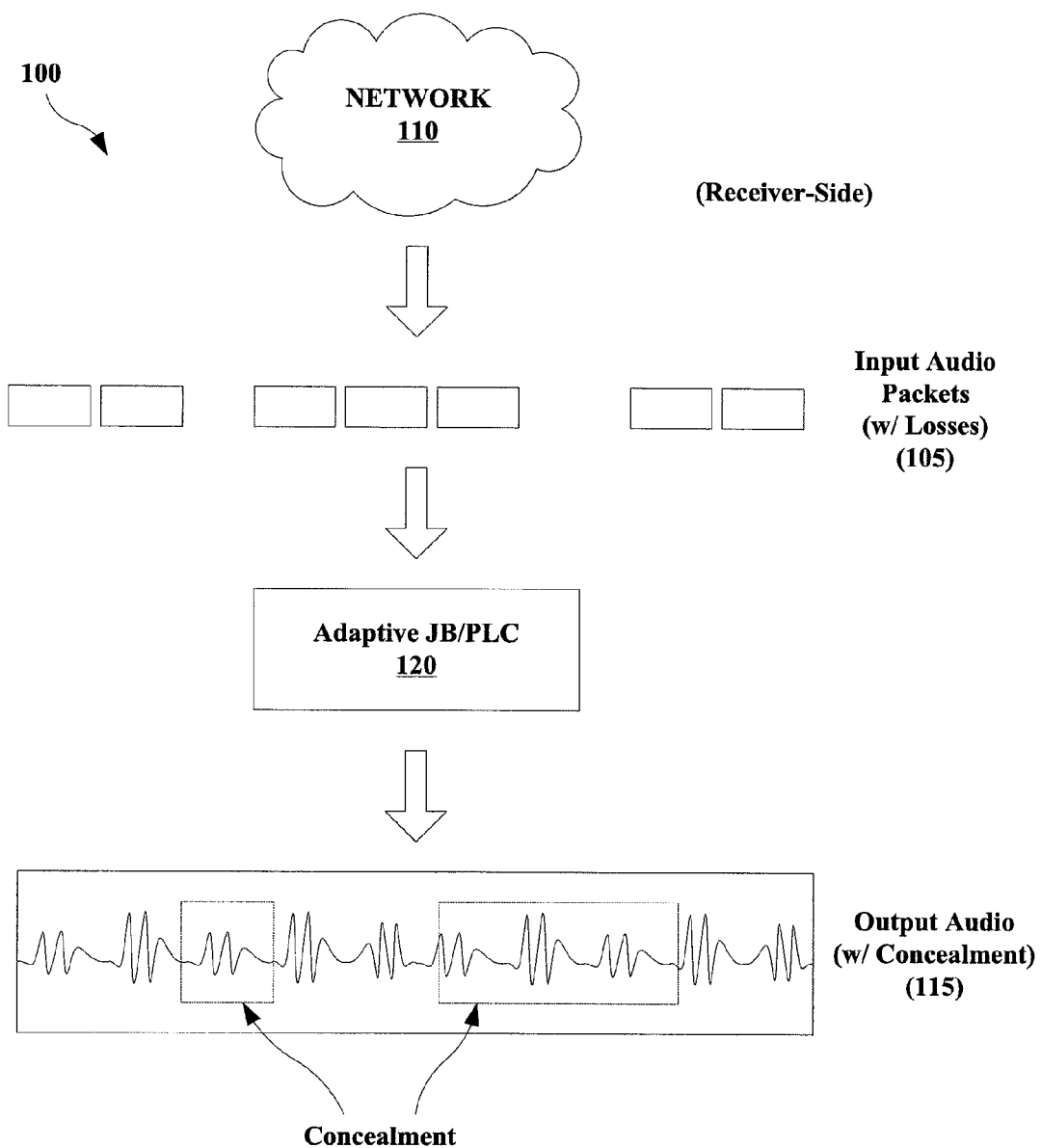
FIG. 1 is a block diagram illustrating an example system of a jitter buffer and packet loss concealer arranged on a receiver side of a communications system in a network environment.

The headings provided herein are for convenience only and do not necessarily affect the scope or meaning of the claimed embodiments.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples and embodiments. One skilled in the relevant art will understand, however, that the examples and embodiments described herein may be practiced without many of these details. Likewise, one skilled in the relevant art will also understand that the examples and embodiments described herein can include many other obvious features not described in detail herein. Additionally, some well-known structures or functions may not be shown or described in detail below, so as to avoid unnecessarily obscuring the relevant description.

Embodiments of the present disclosure relate to methods, systems, and apparatus for removing transient noises (e.g., keyboard "clicks") detected in an audio signal. As will be described in greater detail below, a receiver-side jitter buffer and packet loss concealer (sometimes referred to herein simply as "JB/PLC") may be used on the transmitting side of a communications system to remove transient noises detected in an audio signal before the signal is transmitted over a network to the receiving side of the system.

FIG. 1 is an example system 100 illustrating a jitter buffer and packet loss concealer arranged on a receiver side in a network environment. The system 100 (e.g., a Voice-over-IP (VoIP) system) includes an adaptive JB/PLC 120 arranged on the receiving side (e.g., receiver) of a network 110. The JB/PLC 120 buffers incoming packets 105 containing encoded audio as the packets are received from the network 110. The jitter buffer component of the JB/PLC 120 may be configured to maintain a certain amount of audio data in the buffer so as to strike a beneficial balance between delay and jitter-combating, while the PLC component of the JB/PLC 120 may be configured to conceal the parts of the audio signal that have been lost due to missing packets or late-arriving packets at the receiver. For example, the PLC component of the JB/PLC 120 may conceal the loss of (or late arrival of) packets by simulating the audio information that would have likely been contained in the lost (or late arriving) packets based on previously received packets containing audio data before and/or after the gap in the audio stream. For example, information from one or more previously received packets (which may include audio data from before and/or after the gap in the audio stream) may be used to reconstruct a lost packet. However, rather than simply copying the information from a previously received packet, the PLC may modify the information from the previously received packet in one or more ways to make the reconstructed packet result in natural sounding audio. The output from the JB/PLC 120 may be audio with concealment 115.

Depending on the implementation, the JB/PLC 120 may be configured to perform packet loss concealment in a flexible or adaptive manner, such that it is not necessary to adhere to a particular audio block size. For example, if the block size of audio signal 105 is 10 ms and one block is lost (e.g., discarded), the JB/PLC 120 may produce slightly less or slightly more concealment data than the size (e.g., the 10 ms block size) of the resulting "gap" in the signal, if either adjusted amount of concealment data produces better sound. In accordance with one or more embodiments described herein, the flexibility/adaptability of JB/PLC 120 in performing packet loss concealment operations may be similar to the flexibility/adaptability of JB/PLC 220, which is illustrated in the example system of FIG. 2 and described in greater detail below.

Figure 2:
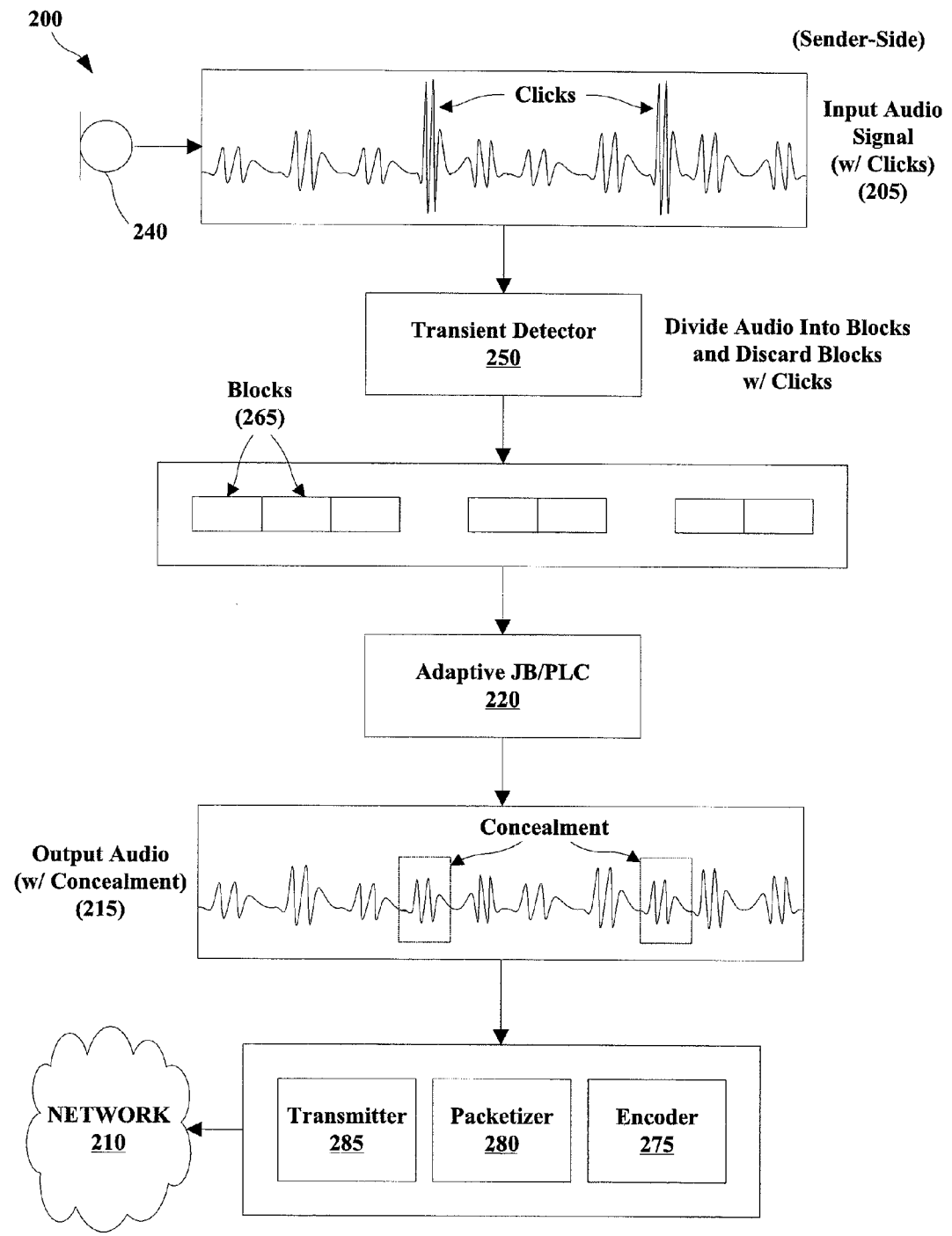
FIG. 2 is a block diagram illustrating an example system of an adaptive jitter buffer and packet loss concealer arranged on a transmitting side of a communications system in a network environment to remove transient noise events detected in an audio signal according to one or more embodiments described herein.

FIG. 2 is an example system 200 showing an adaptive jitter buffer and packet loss concealer arranged on a transmitting side in a network environment 210 to remove transient noise events detected in an audio signal according to one or more embodiments described herein. Whereas the example system described above and shown in FIG. 1 includes a JB/PLC (e.g., JB/PLC 120) arranged on the receiver side, the system 200 (e.g., a Voice-over-IP (VoIP) system) shown in FIG. 2 includes an adaptive JB/PLC 220 deployed on the sender-side (transmitter) of the system 200. It should be noted that although the example system 200 described herein and illustrated in FIG. 2 includes a JB/PLC (e.g., JB/PLC 220) arranged on the sender-side, such an arrangement does not mean that a JB/PLC should be omitted from the receiver-side of the system. Instead, in accordance with one or more embodiments described herein, a JB/PLC may be applied on both the transmitting and receiving ends of the system.

The system 200 may include an audio capture or input device 240 (e.g., microphone). The input device 240 may be configured to input audio signals 205, some of which may be audio signals containing transient noises (e.g., clicks, such as those generated by typing on a keyboard). Such audio signals 205 may be recorded and passed to a transient detector 250 (which may sometimes be referred to herein as a "click detector"). In accordance with at least one embodiment, the transient detector 250 may be configured to analyze the signal 205 to determine the locations of transient noise in the signal, and then divide the signal into blocks (e.g., parts, segments, etc.). For example, the transient detector 250 may divide the audio signal into blocks each containing 10 milliseconds (ms) of audio data. In accordance with one or more other embodiments, the audio signal 205 may be divided into blocks (of, for example, 10 ms of audio data) before the transient detector 250 performs operations to identify locations of transient noise. In such embodiments, additional or new block division may not be performed by the transient detector 250 following identification of the locations where transient noise is present.

In accordance with at least one embodiment described herein, transient detector 250 may analyze the audio signal 205 by utilizing some time-frequency representation (e.g., discrete wavelet transform (DWT), wavelet packet transform (WPT), etc.) of the audio signal as the basis in a predictive model (e.g., Hidden Markov Model (HMM)) to determine the presence and locations of transient noise in the signal. For example, the transient detector 250 may be configured to perform an algorithm that uses a preprocessing stage to decompose the audio signal 205 into a sparse set of coefficients relating to the noise pulses. To minimize false detections, the audio signal may be preprocessed by recursively subtracting tonal components from the signal, to the extent system resources allow.

The algorithm performed by the transient detector 250 may exploit the contrast in spectral and temporal characteristics known to exist between transient noise pulses and speech signals in order to identify the presence and locations of transient noise in the signal. For example, the transient detector 250 may identify voiced parts of the signal by detecting acoustic resonances, or spectral peaks, in the frequency domain. Peaks in the spectral domain can be identified, for example, by thresholding a median filter output or by some other peak-detection method known to those skilled in the art. The voiced parts of the signal may then be extracted from the signal, leaving a residual part of the signal to undergo time-frequency analysis to generate a predictive model of the residual part and determine where in the signal transient noise may be present. For example, in accordance with at least one embodiment, the time-frequency analysis performed on the residual part of the signal may be a discrete wavelet transform. In accordance with at least one other embodiment, the time-frequency analysis performed on the residual part of the signal may be a wavelet packet transform.

In accordance with one or more embodiments, the transient detector 250 may utilize the time-frequency analysis performed on the residual part of the signal as a basis for modeling additive noise in the residual part of the signal. Depending on the implementation, the transient detector may model additive noise in the residual part of the signal as a zero-mean Gaussian process, as an autoregressive (AR) process with estimated coefficients, or as some other random (e.g., stochastic) process known to those skilled in the art.

The blocks of audio data that the signal 205 is partitioned into may be marked with headers indicating their place in the audio signal 205. For example, each of the audio blocks may be marked with a header identifying a sequence number and timestamp for the block. In accordance with at least one embodiment, audio blocks containing transient noise, as indicated by the transient detector 250, may be discarded. The remaining stream of audio blocks 265 may be passed to JB/PLC 220.

In at least one embodiment, the JB/PLC 220 may operate on the blocks of audio 265 in a manner similar to JB/PLC 120, described above and illustrated in the system of FIG. 1. For example, JB/PLC 220 may form an output audio signal 215 by fitting together the available blocks of audio data 265, and concealing the losses. In the present example, the losses present in the audio signal are the blocks that were discarded due to transient noise being detected by the transient detector 250, as described above.

It should be noted that the JB/PLC 220 may be configured to perform loss concealment in a flexible or adaptive manner, such that it is not necessary to adhere to a particular audio block size. For example, if the audio block size is 10 ms, and one block is lost (e.g., discarded), the JB/PLC 220 may produce slightly less or slightly more concealment data (than the 10 ms block size), if either adjusted amount of concealment data produces better sound. One reason that more or less concealment data can sound better is that for a human speech signal there is often a strong pitch period, and synthesizing an integer number of pitch periods usually provides better results. In a scenario where the JB/PLC 220 produces more concealment data than is needed for several iterations, then there may be a growing buffer in the jitter buffer part of the JB/PLC 220. However, since the JB/PLC 220 is adaptive, it may determine that it is housing too much data in its buffer and may decide to compress the data (e.g., in the time domain) slightly for some period of time, in order to further reduce the buffer delay. For example, the JB/PLC 220 may determine that too much data is stored in its buffer if the amount of data stored in the buffer exceeds a threshold amount set by the JB/PLC 220. In one or more embodiments, the threshold amount set by the JB/PLC 220 may be an adjustable threshold amount based on an assessment of the buffer delay.

In accordance with one or more embodiments described herein, the adaptive JB/PLC 220 may be configured to compress the data in the time domain to reduce buffer delays, as described above, and/or may be configured to use the surplus data the next time a transient noise (e.g., keyboard click) must be concealed. For example, suppose that a first click in an audio signal (e.g., audio signal 205) is detected (e.g., by transient detector 250) and thus needs to be concealed. The click caused one block of 10 ms of audio to be dropped, such that the adaptive JB/PLC 220 needs to fill a gap in the audio signal of at least this amount. Further, suppose the pitch period is 7 ms (corresponding to approximately 140 Hz fundamental frequency, a mid-range adult male) and it is desired to produce complete periods. Under such example conditions, two pitch periods would be needed, resulting in a total concealment of 14 ms. Therefore, in accordance with one or more of the embodiments described herein, 4 ms of delay may be added. Now, the next time the JB/PLC 220 determines it is necessary to bridge a 10 ms gap in the audio signal (e.g., due to a second click being detected in the audio signal by the transient detector 250, which therefore causes another block of 10 ms of audio to be dropped), and assuming that the pitch period is still 7 ms, the JB/PLC 220 may instead insert one pitch period and then cut the buffered delay by 3 ms, in accordance with at least one other embodiment described herein. That is, rather than the JB/PLC 220 bridging the full 10 ms gap in the audio, the JB/PLC 220 may partially fill the gap and append the audio that follows the gap earlier than such audio would otherwise be appended. It should be noted that the adaptability/flexibility of the JB/PLC 220 described above may depend on the existence of a "packet" buffer that is capable of handling these fluctuations in delay.

By utilizing the adaptation capabilities of the JB/PLC (e.g., JB/PLC 220, as shown in the example system of FIG. 2), the methods and systems described herein produce better-sounding transient (e.g., click) removal than, for example, an approach that only tries to bridge a fixed-width gap.

The output audio signal 215 from the JB/PLC 220 may be used as an input signal to the remaining components on the transmitting side of the system 200, including, for example, encoder 275, packetizer 280, and transmitter 285.

Figure 3:
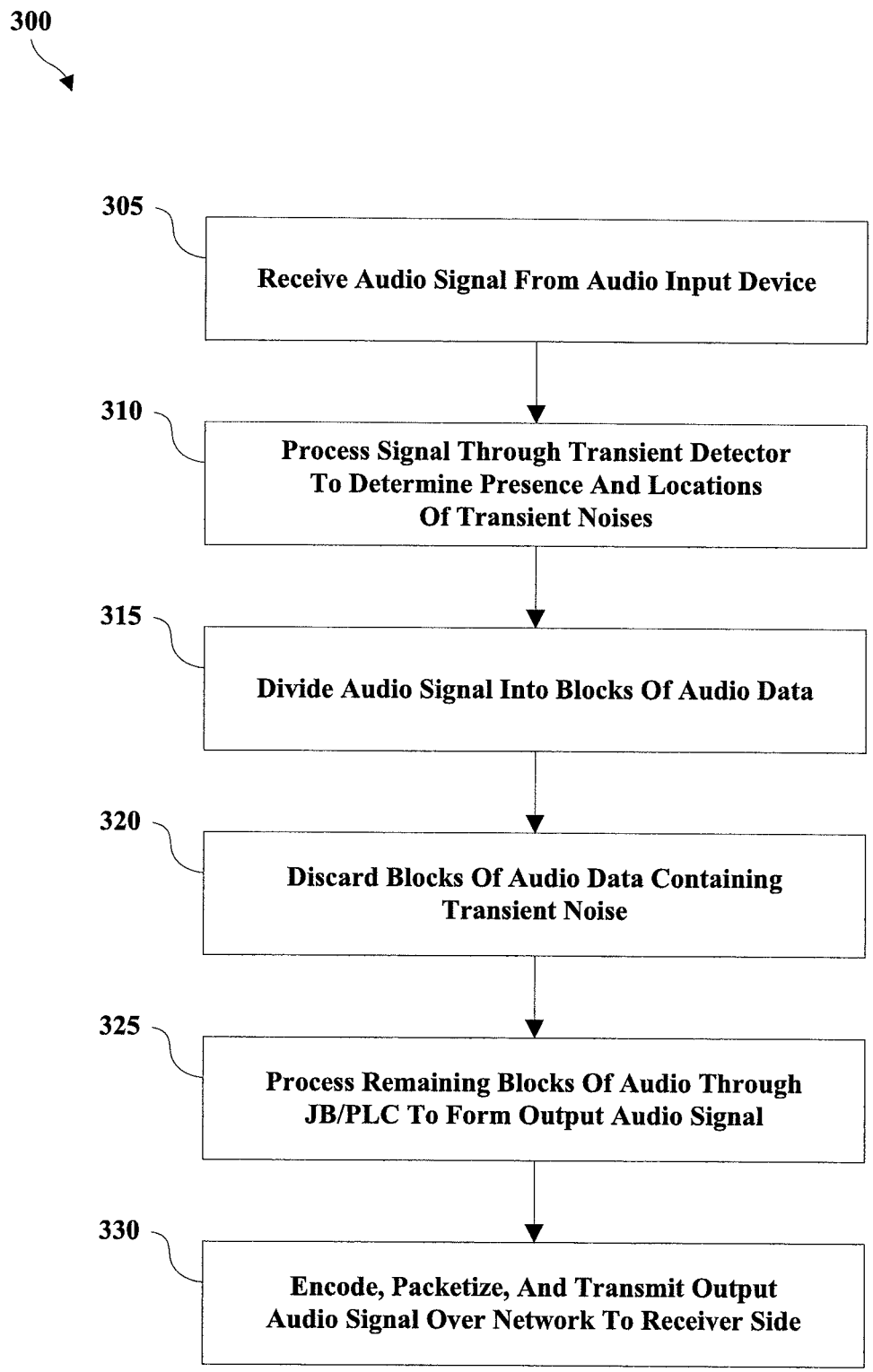
FIG. 3 is a flowchart illustrating an example method for removing a transient noise event detected in an audio signal using an adaptive jitter buffer and packet loss concealer at a transmitting side of a communications system according to one or more embodiments described herein.

FIG. 3 illustrates an example process for removing a transient noise event detected in an audio signal using an adaptive jitter buffer and packet loss concealer according to one or more embodiments described herein. In accordance with at least one embodiment, the example process 300 may be performed at the sender-side (e.g., by system 200 illustrated in FIG. 2 and described in detail above) in a network communications system.

At block 305, an input audio signal may be received from an audio input device (e.g., audio signal 205 received from audio input device 240 in the example system 200 shown in FIG. 2). For example, an audio signal containing speech and/or other audio data may be received as input from a microphone.

At block 310, the audio signal may be processed through a transient detector (e.g., a click detector, such as transient detector 250 in the example system 200 shown in FIG. 2) to determine the presence and locations of any transient noises (e.g., clicks) in the signal. In accordance with at least one embodiment, the processing of the audio signal at block 310 may include analyzing one or more audio signal characteristics of the audio signal to determine the locations of transient noise in the signal. For example, at block 310 the audio signal may be processed through a transient detector configured to perform an iterative algorithm that utilizes some time-frequency representation (e.g., discrete wavelet transform (DWT), wavelet packet transform (WPT), etc.) of the audio signal as the basis in a predictive model (e.g., Hidden Markov Model (HMM)) to determine the presence and locations of transient noise in the signal. In accordance with at least one embodiment, the determination of the presence and locations of transient noises in the signal at block 310 may be made in a manner similar to that of transient detector 250, which is described in greater detail above and illustrated in FIG. 2.

At block 315, the audio signal may be divided into blocks (e.g., parts, segments, etc.) of audio data. For example, the audio signal may be divided (e.g., by transient detector 250) into blocks each containing 10 ms of audio data. In accordance with at least one embodiment, the division of the audio signal into blocks of audio data (at block 315 of the example process 300 shown in FIG. 3) may include marking the blocks of audio data with headers indicating their place (e.g., sequence order) in the audio signal. For example, each of the audio blocks may be marked with a header identifying a sequence number and timestamp for the block.

At block 320, blocks of audio data containing transient noise, as indicated by the transient detector (e.g., from the processing and analysis of the audio signal at block 310), may be discarded. The remaining stream of audio blocks (e.g., blocks 265 in the example system 200 shown in FIG. 2) may be passed to a JB/PLC for processing, as further described below.

At block 325, the blocks of audio that were not discarded at block 320 may be processed through a JB/PLC to form an output audio signal (e.g., audio blocks 265 processed through JB/PLC 220 to form output audio signal 215 in the example system 200 shown in FIG. 2). In accordance with at least one embodiment, processing the remaining stream of audio blocks through the JB/PLC at block 325 may include one or more operations similar to the operations performed by JB/PLC 220 described above with respect to the example system illustrated in FIG. 2. For example, processing the remaining stream of audio blocks through the JB/PLC at block 325 may include forming an output audio signal by fitting together the remaining blocks of audio data and concealing the losses (e.g., the blocks of audio data that were discarded at block 320 due to transient noise being detected by the transient detector at block 310, as described above). Additionally, the processing of the remaining audio blocks at block 325 may include performing packet loss concealment in a flexible or adaptive manner, such that it is not necessary to adhere to a particular audio block size. For example, in accordance with one or more embodiments, the processing performed at block 325 may include packet loss concealment operations similar to the operations described above with respect to JB/PLC 220.

At block 330, the process may include encoding, packetizing, and transmitting the output audio signal formed at block 325 over a network to a receiver side of the communications system. For example, the output audio signal formed by processing the remaining audio blocks (e.g., the blocks of audio data that were not discarded at block 320) through the JB/PLC at block 325 may be used as an input signal to one or more other components on the transmitting side of the communications system including, for example, an encoder (e.g., encoder 275 in the example system 200 shown in FIG. 2) configured for encoding (e.g., compressing, converting, etc.) the output audio signal, a packetizer (e.g., packetizer 280) configured for inserting the encoded audio data into one or more network packets (e.g., IP packets), and a transmitter (e.g., transmitter 285) configured for transmitting the one or more network packets containing the output audio signal over a network (e.g., VoIP network) to a receiver side of the communications system (e.g., VoIP system).

In accordance with one or more other embodiments described herein, the division of the audio signal into blocks of audio data (e.g., block 315 in the example process 300 shown in FIG. 3) may occur prior to processing the audio signal through the transient detector to determine the presence and locations of any transient noises in the signal (e.g., block 310 in the example process 300 shown in FIG. 3). In such embodiments, additional or new block division of the audio signal may or may not be performed (e.g., by transient detector 250 in the example system 200 shown in FIG. 2) following the identification of the locations where transient noise is present (e.g., block 315).

It should also be noted that the audio stream may be "re-blocked" (e.g., partitioned into new blocks) after being processed through the JB/PLC (e.g., at block 325 in the example process 300 shown in FIG. 3). For example, in accordance with one or more embodiments, after the audio is processed through the JB/PLC (e.g., JB/PLC 220 in the example system 200 shown in FIG. 2), new partitioning may be applied to the audio such that the audio is partitioned into new blocks that may not be the same size as the blocks utilized by the transient detector (e.g., at block 315 in the example process 300 shown in FIG. 3). In such embodiments, the original partitioning of the signal (e.g., by the transient detector) is lost when the JB/PLC forms the output signal (e.g., at block 325 in the example process 300 shown in FIG. 3). In accordance with at least one embodiment, new block partitioning may be applied to the audio stream as part of block 330 in the example process 300 illustrated in FIG. 3 and described above.

Figure 4:
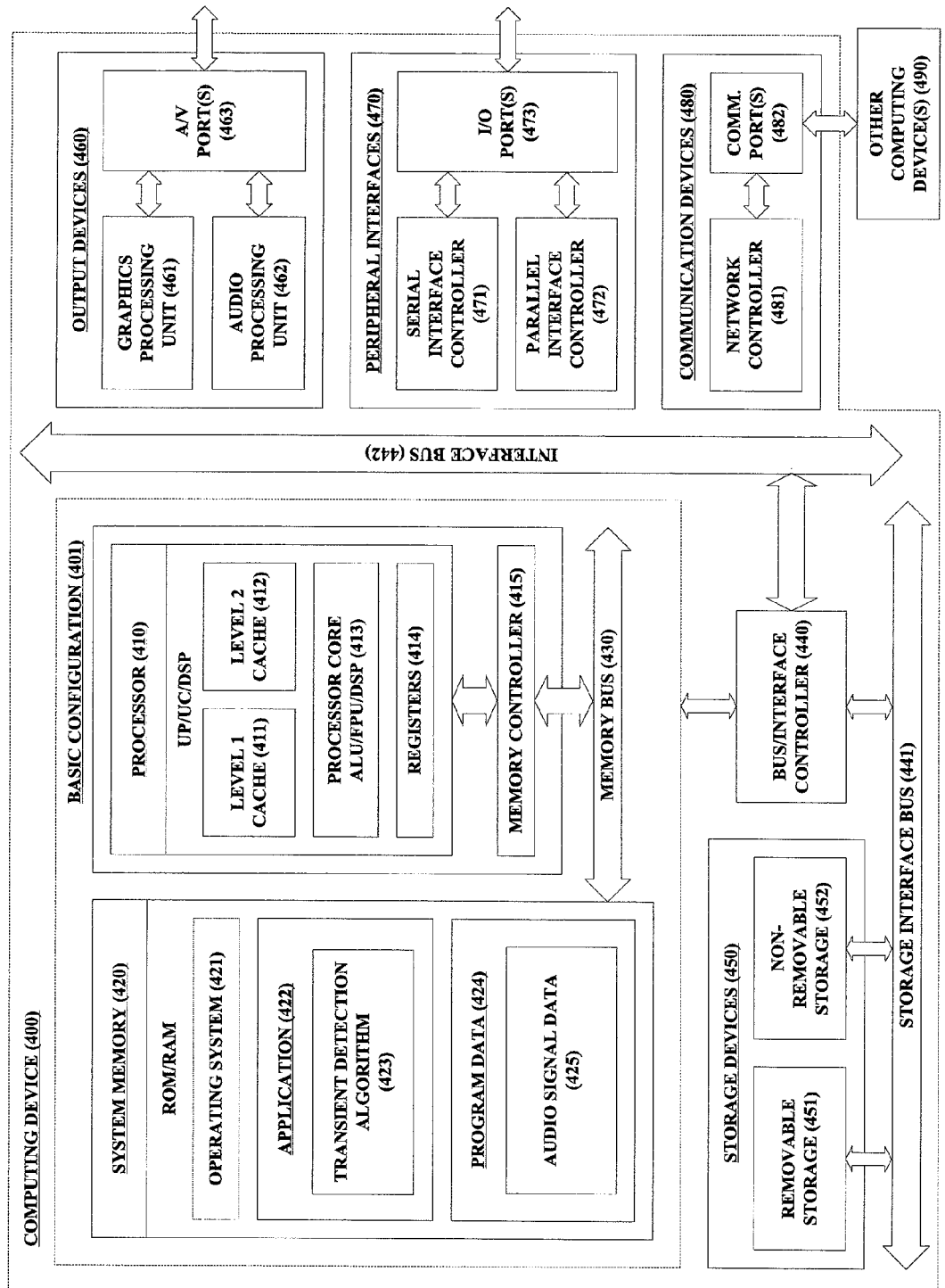
FIG. 4 is a block diagram illustrating an example computing device arranged for removing transient noise events detected in an audio signal at a transmitting side of a communications system according to one or more embodiments described herein.

FIG. 4 is a block diagram illustrating an example computing device 400 arranged for removing transient noise events detected in an audio signal according to one or more embodiments described herein. In particular, in accordance with one or more embodiments of the present disclosure, the example computing device 400 is arranged for implementing an adaptive jitter buffer and packet loss concealer (e.g., JB/PLC 220 of the example system shown in FIG. 2) on the transmitting side of a system (e.g., a Voice-over-IP (VoIP) system) in a network environment. In a basic configuration 401, computing device 400 typically includes one or more processors 410 and system memory 420. A memory bus 430 may be used for communicating between the processor 410 and the system memory 420.

Depending on the desired configuration, processor 410 can be of any type including but not limited to a microprocessor (μP), a microcontroller (μC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 can also be used with the processor 410, or in some embodiments the memory controller 415 can be an internal part of the processor 410.

Depending on the desired configuration, the system memory 420 can be of any type including but not limited to volatile memory (e.g., RAM), non-volatile memory (e.g., ROM, flash memory, etc.) or any combination thereof. System memory 420 typically includes an operating system 421, one or more applications 422, and program data 424. In at least some embodiments, application 422 includes a transient detection algorithm 423 that is configured to detect transient noises (e.g., keyboard clicks) present in an audio signal. The transient detection algorithm 423 (which may be implemented using, for example, a transient detector such as transient detector 250 in the example system 200 shown in FIG. 2) may be further arranged to operate with an adaptive JB/PLC (e.g., JB/PLC 220 in the example system 200 shown in FIG. 2) configured to fit together available blocks of audio data comprising a signal and conceal the losses, where the losses present in the audio signal are blocks of data that were discarded as a result of transient noise being detected by the transient detection algorithm 423.

Program Data 424 may include audio signal data 425 that is useful for detecting transients present in the signal. In some embodiments, application 422 can be arranged to operate with program data 424 on an operating system 421 such that detecting transient noise in an audio signal is based on one or more signal characteristics identified from the audio signal data 425.

Computing device 400 can have additional features and/or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of computing device 400.

Computing device 400 can also include an interface bus 442 for facilitating communication from various interface devices (e.g., output interfaces, peripheral interfaces, communication interfaces, etc.) to the basic configuration 401 via the bus/interface controller 440. Example output devices 460 include a graphics processing unit 461 and an audio processing unit 462, either or both of which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473.

An example communication device 480 includes a network controller 481, which can be arranged to facilitate communications with one or more other computing devices 490 over a network communication (not shown) via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computer-implemented method for removing transient noise in an audio signal at a transmitting-side of a communications system, the method comprising:
   receiving an audio signal from an audio input device located at the transmitting-side of the communications system;
   dividing the received audio signal into blocks of audio data;
   identifying one or more of the blocks of audio data containing transient noise;
   discarding the one or more blocks of audio data containing transient noise; and
   performing loss concealment on the remaining blocks of audio data to form an output audio signal, wherein the loss concealment is performed at the transmitting-side of the communications system by an adaptive jitter buffer and packet loss concealer; and
   partitioning, after loss concealment, the output audio signal into new blocks of audio data.

2. The computer-implemented method of claim 1, wherein identifying the one or more blocks of audio data containing transient noise includes processing the audio signal through a transient detector to determine locations of transient noise in the audio signal.

3. The computer-implemented method of claim 1, wherein identifying the one or more blocks of audio data containing transient noise includes:
   analyzing one or more audio signal characteristics of the audio signal; and
   identifying locations of transient noise in the audio signal based on the analyzed audio signal characteristics.

4. The computer-implemented method of claim 1, wherein each of the blocks of audio data contains 10 ms of audio.

5. The computer-implemented method of claim 1, wherein dividing the audio signal into blocks of audio data includes marking each of the blocks of audio data with a header identifying a sequence number for the block relative to other blocks of the audio signal.

6. The computer-implemented method of claim 1, further comprising:
   encoding the output audio signal;
   packetizing the encoded output audio signal into a plurality of network packets; and
   transmitting the plurality of network packets over a network to a receiving-side of the communications system.

7. The computer-implemented method of claim 1, wherein performing loss concealment on the remaining blocks of audio data to form an output audio signal includes:
   combining the remaining blocks of audio data;
   identifying one or more gaps in the combined blocks of audio data, wherein the one or more gaps represent the one or more discarded blocks of audio data containing transient noise; and
   generating concealment data for each of the one or more gaps in the combined blocks of audio data.

8. The computer-implemented method of claim 7, wherein the concealment data generated for each of the one or more gaps in the combined blocks of audio data is based on audio data contained in blocks before and/or after the gap.

9. The computer-implemented method of claim 7, wherein generating concealment data for each of the one or more gaps in the combined blocks of audio data includes generating an amount of concealment data that is more or less than an amount of audio data contained in each of the combined blocks of audio data.

10. The computer-implemented method of claim 7, wherein generating concealment data for each of the one or more gaps in the combined blocks of audio data includes generating an amount of concealment data that is more than a corresponding size of the gap, and further comprising:
    determining that an amount of audio data stored in a buffer of the adaptive jitter buffer and packet loss concealer exceeds a threshold amount set for the buffer; and
    compressing the audio data stored in the buffer in the time domain to reduce the amount of audio data below the threshold amount.

11. A system for removing transient noise in an audio signal at a transmitting-side of a communications network, the system comprising:
    a transient detector configured to:
      receive an audio signal from an audio input device located at the transmitting-side of the communications system,
      divide the received audio signal into blocks of audio data,
      identify one or more of the blocks of audio data containing transient noise, and
      discard the one or more blocks of audio data containing transient noise; and
    an adaptive jitter buffer and packet loss concealer configured to perform loss concealment on the remaining blocks of audio data to form an output audio signal, wherein the adaptive jitter buffer and packet loss concealer perform the loss concealment at the transmitting-side of the communications network; and
    partitioning, after loss concealment, the output audio signal into new blocks of audio data.

12. The system of claim 11, wherein the transient detector is configured to:
    analyze one or more audio signal characteristics of the audio signal received from the audio input device; and
    identify locations of transient noise in the audio signal based on the analyzed audio signal characteristics.

13. The system of claim 11, wherein each of the blocks of audio data contains 10 ms of audio.

14. The system of claim 11, wherein the transient detector is configured to mark each of the blocks of audio data with a header identifying a sequence number for the block relative to other blocks of the audio signal.

15. The system of claim 11, further comprising:
    an encoder configured to encode the output audio signal;
    a packetizer configured to packetize the encoded output audio signal into a plurality of network packets; and
    a transmitter configured to transmit the plurality of network packets over a network to a receiving-side of the communications system.

16. The system of claim 11, wherein the adaptive jitter buffer and packet loss concealer is configured to:
    combine the remaining blocks of audio data;
    identify one or more gaps in the combined blocks of audio data, wherein the one or more gaps represent the one or more blocks of audio data containing transient noise discarded by the transient detector; and
    generate concealment data for each of the one or more gaps in the combined blocks of audio data.

17. The system of claim 16, wherein the adaptive jitter buffer and packet loss concealer is configured to generate the concealment data for each of the one or more gaps in the combined blocks of audio data based on audio data contained in blocks before and/or after the gap.

18. The system of claim 16, wherein the adaptive jitter buffer and packet loss concealer is configured to generate an amount of concealment data that is more or less than an amount of audio data contained in each of the combined blocks of audio data.

19. The system of claim 16, wherein the adaptive jitter buffer and packet loss concealer is configured to:

generate an amount of concealment data that is more than a corresponding size of the gap;

determine that an amount of audio data stored in a buffer of the adaptive jitter buffer and packet loss concealer exceeds a threshold amount set for the buffer; and compress the audio data stored in the buffer in the time domain to reduce the amount of audio data below the threshold amount.

20. One or more non-transitory computer readable media storing computer-executable instructions that, when executed by one or more processors, causes the one or more processors to perform operations comprising:

receiving an audio signal from an audio input device located at a transmitting-side of a communications system;

dividing the received audio signal into blocks of audio data;

identifying one or more of the blocks of audio data containing transient noise;

discarding the one or more blocks of audio data containing transient noise; and performing loss concealment on the remaining blocks of audio data to form an output audio signal, wherein the loss concealment is performed by an adaptive jitter buffer and packet loss concealer at the transmitting-side of the communications system, and includes:

combining the remaining blocks of audio data, identifying one or more gaps in the combined blocks of audio data, wherein the one or more gaps represent the one or more discarded blocks of audio data containing transient noise, and generating concealment data for each of the one or more gaps in the combined blocks of audio data; and partitioning, after loss concealment, the output audio signal into new blocks of audio data.

* * * * *